AUTOMATIC SHUT-OFF DEVICE
Filed Dec. 15, 1967
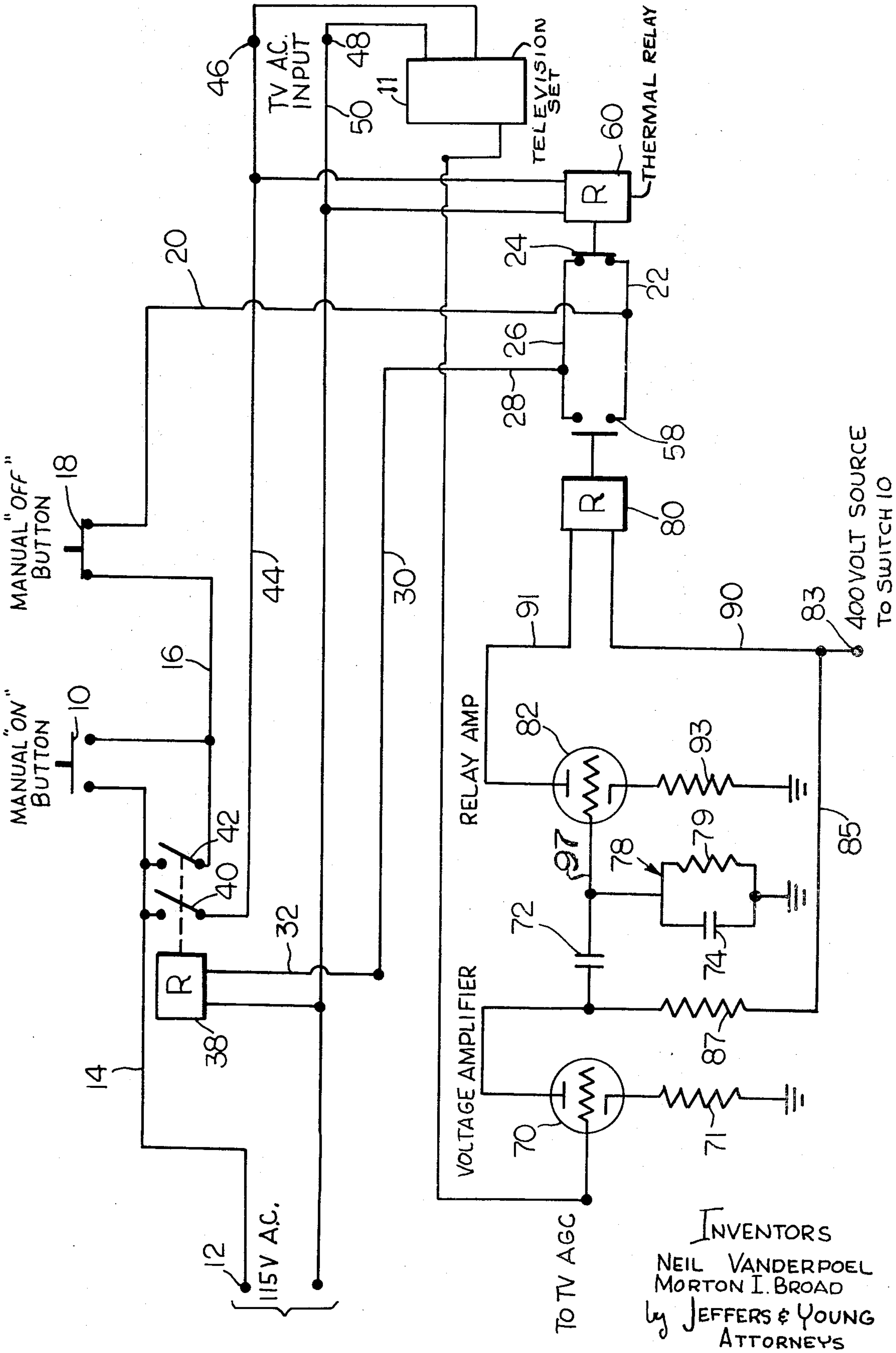
INVENTORS
NEIL VANDERPOEL
MORTON I. BROAD
by JEFFERS & YOUNG
ATTORNEYS

1

3,541,453
AUTOMATIC SHUT-OFF DEVICE

Neil Vanderpoel and Morton Irwin Broad, St. Petersburg, Fla., assignors to The Magnavox Company, Fort Wayne, Ind., a corporation of Delaware Filed Dec. 15, 1967, Ser. No. 691,002
Int. Cl. H04b *1/16*
U.S. Cl. 325—364 4 Claims

ABSTRACT OF THE DISCLOSURE

This invention relates to a device for receiving an electromagnetic signal and, responsively to a tuned condition of the television set or other equipment with which it is related, will maintain the equipment in an "on" condition. However, when the television set or other equipment is in an untuned condition either because of a loss of power from the transmitting station, or because of a failure of the set to be properly tuned, a suitable timing mechanism will, after a predetermined interval, effect shut-off of the set.

This invention relates to a device for automatically shutting off such equipment as television receivers and the like.

BACKGROUND OF THE INVENTION

In the prior art, it has been proposed to provide certain automatic devices for effecting shut-off of various equipment, such as radios and the like. Such equipment, however, tends to be unsatisfactory because of the necessity for operating certain switches once the equipment is tuned thus adding inconveniencies in operation of the equipment. In effect, the equipment adds additional complication to achieve the advantage of an automatic shut-off after the station or channel has "signed off." In another general solution to the problem of producing shut-off equipment, there has been proposed certain clock mechanisms which at a certain time will produce a shut-off of the radio or television equipment, but this equipment is intended to function at the preset time of the clock regardless of the tuned or untuned condition of the set, and it should be borne in mind that the clock must always itself be "set."

An invention related to the present one is disclosed in United States application Ser. No. 675,664, filed Oct. 16, 1967 in the name of Louis F. Mayle and assigned to the Magnavox Company.

OBJECTS OF THE INVENTION

It is one of the foremost objects of the present invention to provide an automatic shut-off device for television equipment which need not be "set" and which will automatically turn off the television receiver upon loss of signal either because the station or channel has "signed off" or is in an untuned condition for a predetermined time.

The automatic shut-off feature will apply whether the

2 television station has discontinued broadcasting, or is malfunctioning, or if the set is itself improperly tuned, and all of this without requiring any "setting" or further intervention of the viewer.

A still further object of the present invention is to provide a simple shut-off device which can be readily incorporated into a television receiver to perform the function of turning off the television receiver, automatically and without preset, and will perform its intended function without any need for "adjustment" or "set" on the part of the operator.

Another object of the present invention is to provide a device for automatically shutting off a television receiver, which can be incorporated into various portions of the television receiver and which can be comprised of simple components.

Other objects and features of the present invention will become apparent from a consideration of the following description which proceeds with reference to the accompanying drawings, wherein an example embodiment is illustrated by way of example.

In the drawings:

The figure is a schematic diagram illustrating an embodiment of my invention.

Referring now to the drawing, a television receiver 11 is initially, manually turned on by closing mounting contact switch 10 which connects a 115 volt power source 12 through conductor 14, closed switch 10, conductor 16, normally losed switch 18, conductor 20, conductor 22, closed switch 24, conductor 26, conductor 28, conductor 30, conductor 32, energizing relay 38 to close switches 40 and 42 which are spring urged to an open position. Closed switch 40 makes a circuit through conductor 14, closed switch 40, conductor 44 to turn the television or other equipment on at terminal 46 of conductor 44 and terminal 48 of conductor 50. Closed switch 42 maintains a circuit from source 12 to relay 38 though "on" button 10 is opened. After switches 40 and 42 are closed, the circuit will be maintained as described until the set warms up, at which time thermal relay 60 is set to open by means of a thermal time delay and thereafter, the circuit energizing relay 38 is maintained by means of a second switch 58 which is normally open and is closed only when the television set or other equipment is tuned to a broadcasting channel. Operation of the switch 58 will be hereinafter described. After the television set is initially turned on by closing the switch 10, it is then maintained "on" only temporarily by means of the thermal time delay switch 60, and it can only be manually turned off by opening the switch 18. Momentarily opening the switch 18 will break the circuit including the relay 38, thereby opening switches 40 and 42 and turning the television set off.

Assuming the set is tuned during the warm-up period to a transmitting channel, there will be effected a closing of the normally open switch 58 and thereby hold switches 40 and 42 closed even after the normally closed thermal delay relay switch 24 is opened. Thus, during the warm-up period, although the set is in a nontuned condition, the television set is held "on" by the switch 24 although ultimately operation of the relay 38 and switches 40, 42 are controlled by operation of the switch 58 after the set has warmed up.

Relay 80 in a deenergized condition will move switch 58 to an open position. When "on" button 10 is closed, plate voltage of 400 volts is applied to tube 82 and when the grid is at ground potential or positive potential, tube 82 will conduct energizing relay 80 closing switch 58.

When a negative AGC signal is applied to the grid of tube 70, tube 70 will be in an off condition so that the potential on the left plate of capacitor 72 will be substantially at 400 volts, the potential of source 83.

When the AGC signal is interrupted to the grid of tube 70, tube 70 will begin to conduct since then the grid will become more positive. When tube 70 conducts, the plate voltage will fall due to the voltage drop across resistor 87. This drop in plate voltage will cause a drop in the voltage of the left hand plate of capacitor 72 after a predetermined time, which time is controlled by the RC time constant of the RC circuit of capacitor 72, and resistor 87 and tube resistance of tube 70.

After the left plate of capacitor 72 falls in voltage, the right hand plate of capacitor 72 will follow this drop causing the grid of tube 82 to also fall in voltage, turning off tube 82, deenergizing relay 80 and opening switch 58 turning off the power to the television set. Value of capacitors 72 and 74 may be 10 and 30 microfarads respectively, and resistor 87 may be 10 megohms, cathode resistor 71 is selected so that plate resistance of tube 70 appears as 10 megohms. With these values a delay of over 15 seconds has been obtainable. The value of resistor 93 for this condition is 2.2 kilohms.

In operation, assuming that the operator has closed the switch 10 to turn the set on, a circuit is made through conductors 14, 16, closed switch 18, conductors 20, 22, closed switch 24, conductors 26, 28, 30, 32 to energize the coil of relay 38 to close the switches 40, 42 and maintain them closed, even though the switch 10 is immediately reopened (note bypass conductor 14, switch 42, conductor 16).

The television set 11 may be manually turned off if switch 18 is opened, breaking the circuit to relay 38 thereby opening switches 40, 42. Immediately upon opening switches 40, 42 the television set is turned off. It is only prior to depressing the "on" button and during the warm-up interval that switch 24 is closed, thereby making a circuit to energize relay 38 and after the warm-up period, the switch 24 is opened, so that a circuit for energizing the relay 38 can be maintained only by closing of the switch 58, the switch 58 being closed by operation of the relay 80 which is energized from a voltage source 83 through conductor 90, coil of relay 80, conductor 91, conducting vacuum tube 82, and conductor 93. The switch 58 is closed as long as the grid of conducting vacuum tube 82 is at ground potential or is at positive bias as determined by the right hand plate of capacitor 72, such condition in turn being effected so long as there is an AGC signal obtained from a tuned channel.

When an AGC signal is present, the tube 70 is nonconductive and the 400 volt source 83 causes a like voltage to appear on the left hand plate of capacitor 72. But once the AGC signal is lost the tube 70 is conductive and the IR drop across resistor 87 from voltage source 83, will cause a diminishing of voltage on the left hand plate of capacitor 72 and in time produce occurrence of negative voltage in the right hand plate of capacitor 72. The described events are subject to time functions which are adjustable so that after 15 seconds or so the resulting negative bias on the grid of relay amplifier 82 will cause the tube to become nonconductive and acts as a switch preventing source 83 from energizing relay 80. When relay 80 is deenergized, the switch 58 is opened. Should the AGC signal be lost, either because of the channel going off the air, or owing to untuned condition of the set, or a malfunctioning in the broadcasting channel for a predetermined period of time, this will in turn deenergize the solenoid 38 by opening switches 40 and 42, thus turning off the television set.

To energize the set, 71, the television set is turned on by again momentarily closing switch 10 and connecting the power source 12 through conductors 14, 16, closed switch 18 and conductor 20 to energize relay 38 and again turn on the television set. The discharge or decay rate of a capacitor 72 can be selected in relation to the discharge or decay rate of capacitor 74, so that there is a slight delay before the switch or tube 82 is operated.

In another embodiment of this invention, shorting contacts may be used on the tuner which would operate during the time between tuning from one channel to another to connect conductor 97 to ground or to make other suitable connections, to maintain the relay 38 energized during the time that a new channel is being selected.

Matters of capacitor size and decay rate are related to design considerations, and those skilled in the art can be expected to select the size and characteristics of electrical components to provide the necessary time delays and values appropriate for each application. The thermal relay 60 has an operating characteristic which is related to the charging period for the capacitor 72, so that when the television is initially turned on, the time for heat-up of the relay 60 is of sufficient duration so that the relay 80 will be energized, closing the switch 58 well within the period of time during which switch 24 is closed by thermal relay 60. The viewer has ample opportunity to tune in a broadcasting channel and the presence of an AGC signal will then effect closing of switch 58 before the thermal relay 60 produces an opening of switch 24.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention, and it is intended that such revisions and adapations will be included within the scope of the following claims as equivalents of the invention.

What is claimed is:

1. Apparatus comprising:

a receiving set for receiving and transforming a plurality of electromagnetic signals into humanly sensible signals, a power supply for supplying the power for said reception and transformation of said electromagnetic signals, said power supply capable of being switched between an off and on condition, shut off means responsive to the absence of any of said electromagnetic signals to automatically switch said power supply to an off condition, thereby deenergizing all said means, and normally closed thermal delay relay means responsive to an on condition of said power supply and effective to temporarily supersede said shut off means during warm up of said receiving set.

2. A television apparatus comprising:

a television receiving set for receiving and transforming a plurality of electromagnetic signals to a corresponding television channel video and audio signals, a power supply for supplying power for said reception and transformation of said channel signals, said power supply capable of being switched between an off and on condition, shut off means energized by said power source responsive to absence of any of said channel signals to automatically switch said power supply to an off condition without any manual operation after switching said power supply to an on condition, said shut off means comprising;

first normally open relay means having power transmitting switch contacts and self energization maintaining switch contacts, and second normally open relay means having switch contacts connected in series with said self energization maintaining switch contacts, said relay being energized in response to the presence of channel signals and deenergized in response to the absence of channel signals for a predetermined time.

3. The apparatus of claim 2 further comprising third normally closed relay means, said third relay means having switch contacts connected in parallel with said switch contacts of said second relay, said third relay being a thermal delay relay responsive to an on condition of said power supply.

4. The apparatus of claim 2 further comprising a capacitor associated with said shut-off means which charges in response to the presence of channel signals and discharges when said channel signals are absent, said capacitor determining said predetermined time.

References Cited

UNITED STATES PATENTS

| | | | |
|---|---|---|---|
| 2,356,364 | 8/1944 | Tice | 325—364 XR |
| 2,817,025 | 12/1957 | Adler. | |
| 3,005,095 | 10/1961 | Stover et al. | 325—364 |
| 3,317,841 | 5/1969 | Omanoff | 325—364 |
| 2,923,862 | 2/1960 | Teich | 178—6 |
| 3,378,775 | 4/1968 | Joseph | 325—395 |

RICHARD MURRAY, Primary Examiner

R. S. BELL, Assistant Examiner

U.S. Cl. X.R.

178—6; 325—393; 325—395